April 30, 1963 R. I. ROBINSON 3,088,042
ELECTRIC MOTOR WITH IMPROVED COOLING MEANS
Filed Nov. 23, 1959 4 Sheets-Sheet 1
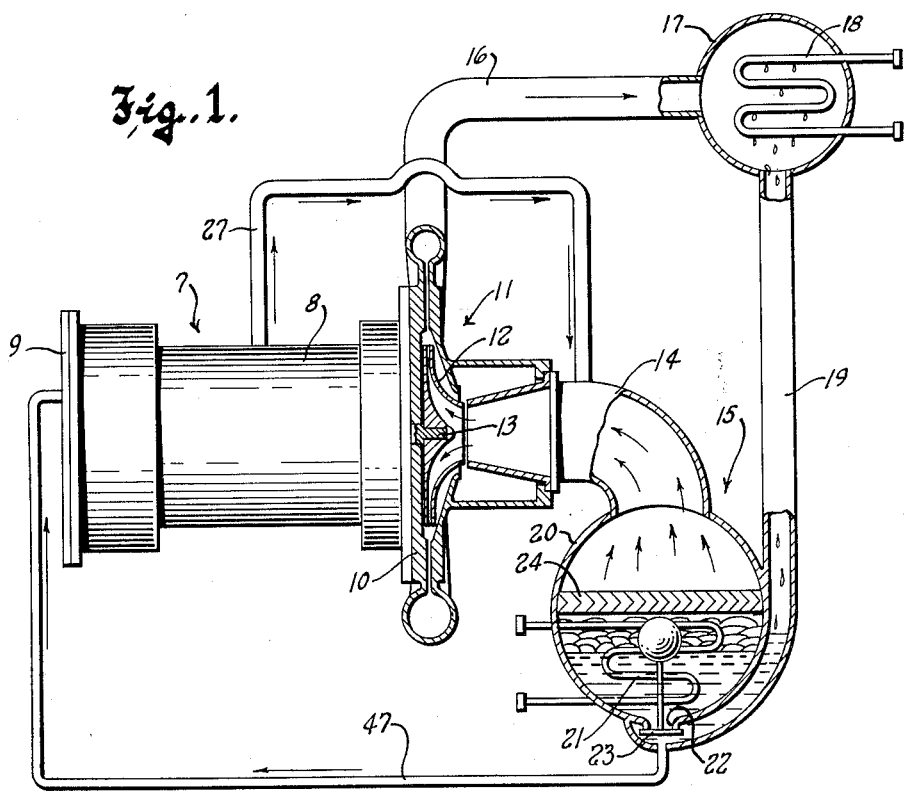
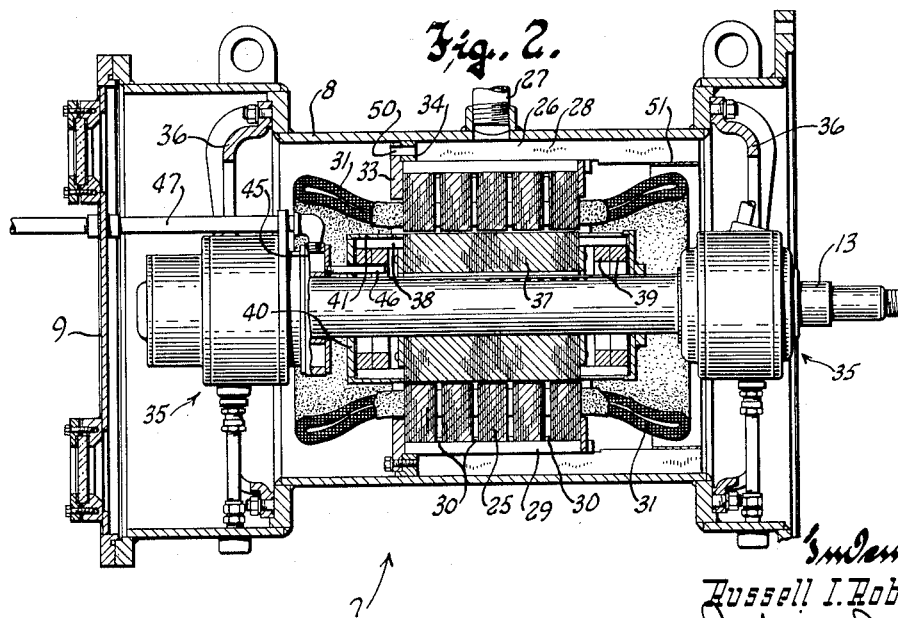

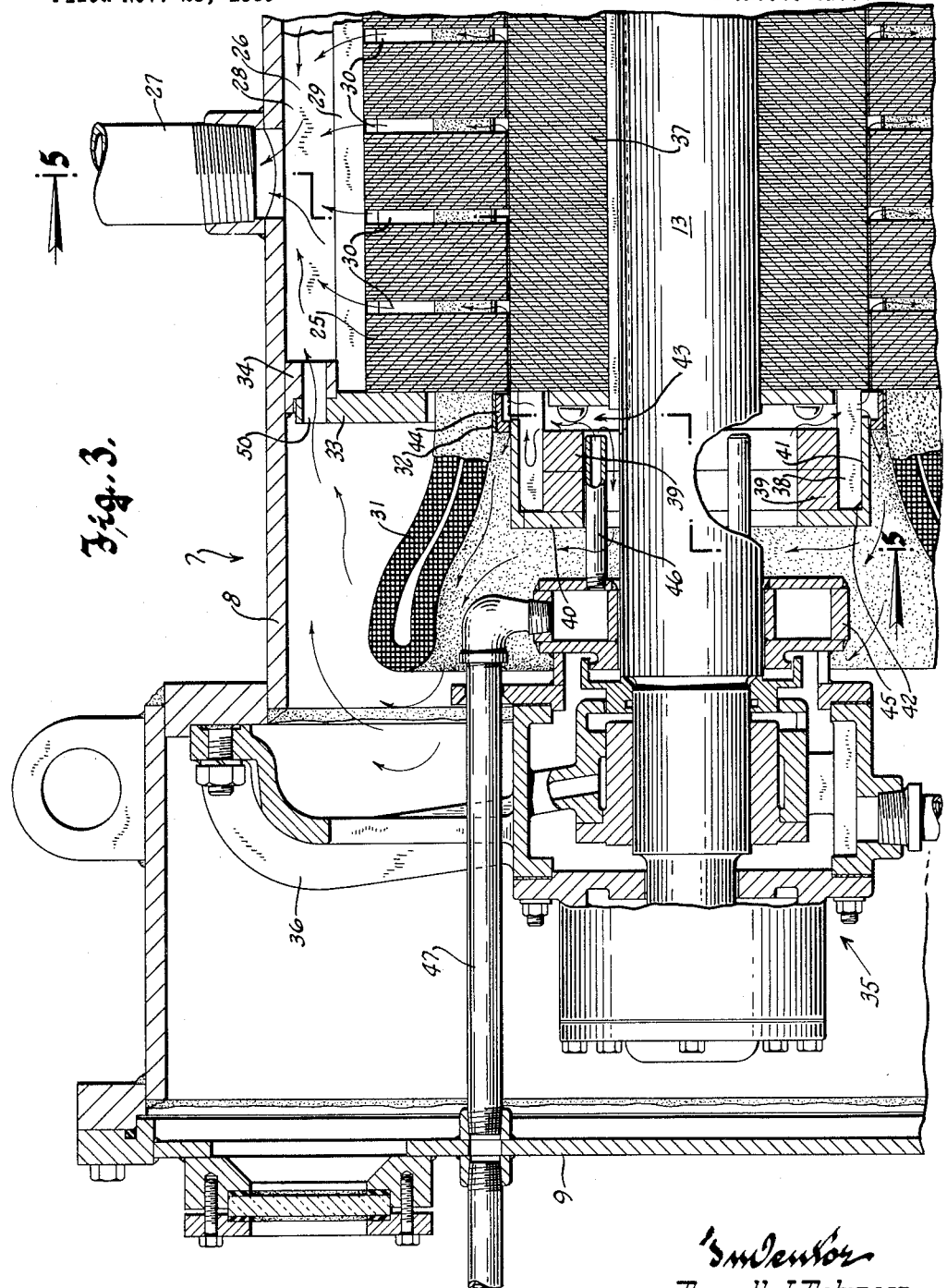

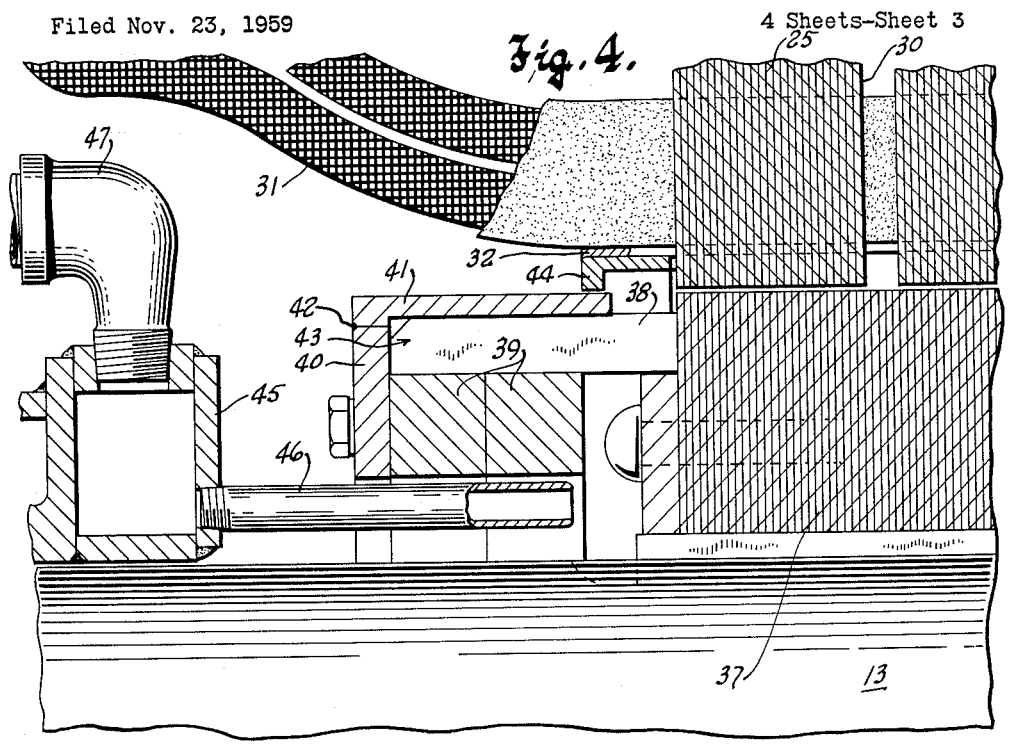
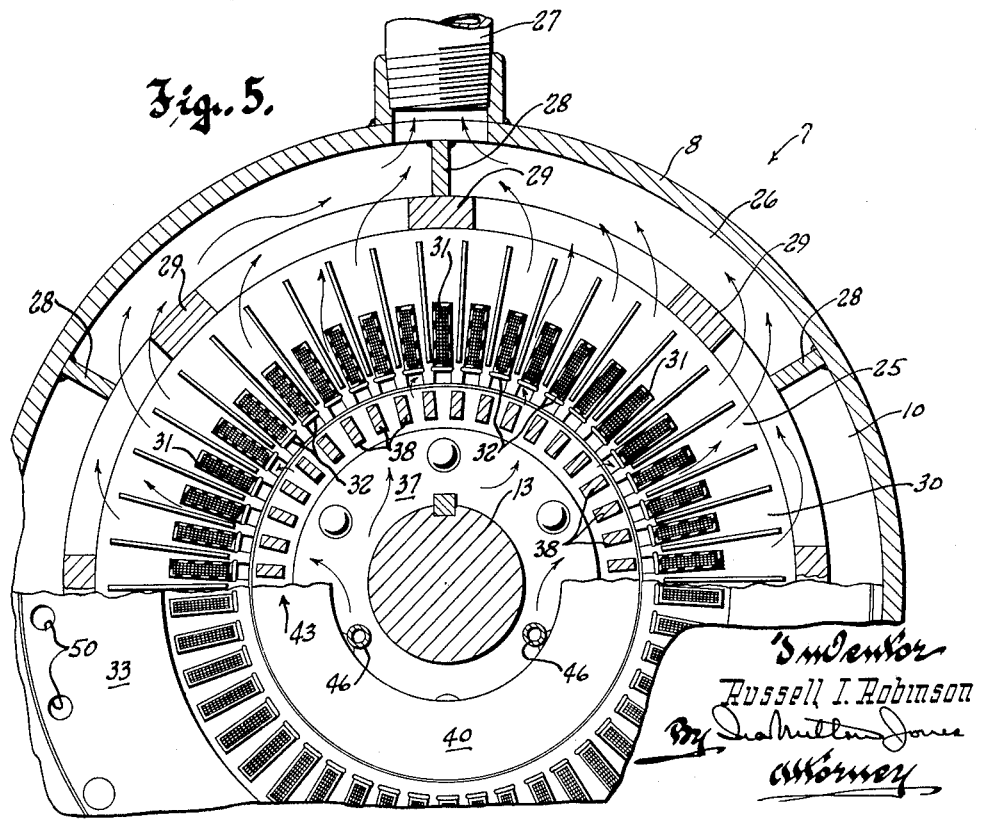

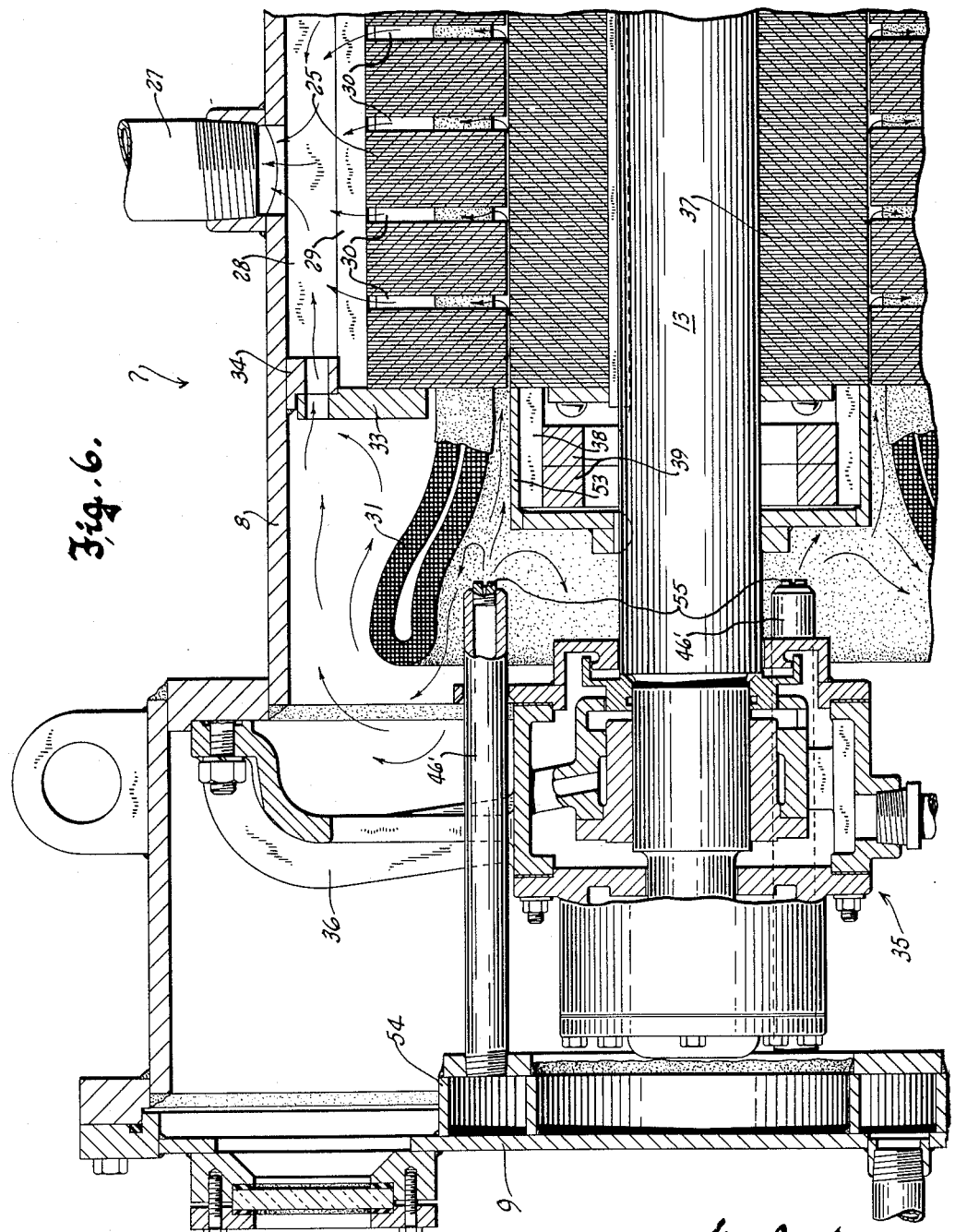

United States Patent Office 3,088,042
Patented Apr. 30, 1963

3,088,042
ELECTRIC MOTOR WITH IMPROVED
COOLING MEANS
Russell I. Robinson, Thiensville, Wis., assignor to The
Louis Allis Company, Milwaukee, Wis., a corporation
of Wisconsin
Filed Nov. 23, 1959, Ser. No. 854,786
6 Claims. (Cl. 310—54)

This invention relates to improvements in dynamo-electric machines, and has as its purpose to improve the cooling of such machines and, particularly, to improve the cooling of totally enclosed large electric motors.

Despite the many different cooling schemes that have been devised in the past to carry off the heat generated in an electric motor, there is still considerable room for improvement in this respect. This is especially so in the case of large totally enclosed motors, as for instance, motors rated at 600 H.P.

The problem is exceptionally acute in the large motors used to drive the compressor or compressors of high capacity refrigerating systems, but, fortunately, in such installations, there is available a very satisfactory source of refrigerant that can be used to cool the motor, providing that the refrigerant is effectively circulated through the motor.

It is, therefore, the purpose and object of this invention to provide more effective means for introducing a fluid cooling medium into the interior of an electric motor, to the end that a liquid refrigerant derived from the refrigerating system with which the motor is used, may be positively projected into the clearance or gap between the rotor and stator cores of the motor, to be there vaporized as its abstracts heat energy from this hottest zone in the motor and then discharged as a gas through radial passages in the stator core.

With the above and other objects in view which will appear as the description proceeds, this invention resides in the novel construction, combination and arrangement of parts substantially as hereinafter described and more particularly defined by the appended claims it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which:

FIGURE 1 illustrates a refrigerating system equipped with a motor driven compressor, and illustrating the manner in which the cooling means for the motor is connected with the refrigerating system;

FIGURE 2 is an enlarged longitudinal sectional view through the motor;

FIGURE 3 is a longitudinal sectional view through a portion of the motor at a still larger scale, and illustrating particularly the manner in which the liquid refrigerant is introduced into the interior of the motor in accordance with one embodiment of the invention;

FIGURE 4 is a fragmentary detail view of a portion of the structure shown in FIGURE 3 at a still larger scale;

FIGURE 5 is a cross sectional view through FIGURE 3 on the plane of the line 5—5; and FIGURE 6 is a view similar to FIGURE 3 but illustrating a somewhat modified embodiment of the invention.

Referring now particularly to the accompanying drawings, in which like numerals indicate like parts, the numeral 7 designates generally an electric motor equipped with the cooling means of this invention and serving as the power unit for the compressor of a refrigerating system.

The motor is of the totally enclosed type and its housing, which comprises a cylindrical shell 8, and end walls 9 and 10, is so connected into the closed refrigerating system that running seals between rotating and stationary parts are entirely eliminated.

The end wall 10 provides the housing for a centrifugal pump 11 which serves as the compressor of the refrigerating system, the impeller 12 of which is mounted directly upon the adjacent end of the motor shaft 13. The inlet of the pump 11 has gaseous refrigerant fed thereto by a pipe 14 which leads from the evaporator 15 of the system. The refrigerant compressed by the pump 11 is discharged through a duct 16 into a condenser 17. In the condenser, the compressed gaseous refrigerant is cooled and liquified as it passes over a condenser coil 18 through which cold water circulates. The liquid refrigerant then flows from the condenser through a duct 19 into the shell or casing 20 of the evaporator 15 where it vaporizes and chills the liquid heat exchange medium flowing through the coil 21 of the evaporator 15.

The connection between the duct 19 and the shell 20 is such that a substantially constant reserve of liquid refrigerant is maintained in the shell. Accordingly, the duct 19 opens to the bottom of the shell through a port 22 which is adapted to be closed by a float controlled valve 23. The float controlling the valve rises and falls with the level of the liquid in the shell and thus serves to maintain the liquid level therein substantially constant, regardless of the level of the liquid in the duct 19.

The evaporator 15 is also preferably provided with a liquid eliminator or strainer 24 above the liquid level therein, to guard against liquid refrigerant being carried up into the pipe 14.

The motor 7 has the customary laminated stator core 25 mounted in the housing or shell 8, but in a way which spaces the periphery of the core from the shell, to define an annular receiving chamber 26 encircling the stator core and with which an outlet duct 27 connects. To mount the stator core in this manner, it is supported from the wall of the shell by a plurality of circumferentially spaced longitudinally extending bars 28 welded, or otherwise fixed, to the shell. Other bars 29 spaced around the periphery of the stator core serve to hold its laminations in proper stacked relationship, with the laminations arranged in spaced apart groups to provide a plurality of radial passages 30, all of which open into the receiving chamber 26. The laminations of the stator core have the customary winding slots in which the windings 31 of the stator are situated with their end portions projecting beyond the opposite ends of the stator, the windings being held in their respective slots by strips 32 usually referred to as wedges.

Although the bars 29 locate and hold the stator concentrically disposed with respect to the shell 8, they do not secure the stator core in place. This is done by bolting a ring 33 which is fixed to one end of the stator core, to a ring 34 fixed in the shell 8 against the adjacent ends of the bars 28.

The shaft 13 of the motor is journalled in suitable bearings, designated generally by the numeral 35, which bearings are supported in the opposite ends of the housing by spiders 36 and, between its bearings, the shaft mounts the rotor core 37. The core 37, as is customary, is also laminated and, being of the squirrel cage type, has winding bars 38 embedded in its peripheral portion, with the bars projecting beyond the opposite ends of the core. The extremities of the bars are connected by short-circuiting rings 39 and, in the preferred embodiment of the invention illustrated in FIGURES 1 to 5, inclusive, at one end of the rotor the winding bars have a flat ring 40 and a short cylinder 41 mounted thereon and connected together, as at 42, the flat ring 40 being secured against the ends of the winding bars and the short cylinder 41 encircling the bars and having its inner edge spaced from the adjacent end of the rotor core.

The winding bars 38 provide the blades of a fan or blower, indicated generally by the numeral 43, the inlet to which is defined by the inner edge of the flat ring 40, and the outlet of which is the space between the inner edge of the short cylinder 41 and the adjacent end of the rotor core. The outlet of the blower is thus contiguous to the clearance or air gap between the stator and rotor cores; and to deflect the flowing media issuing from the blower into this clearance or gap, an annular baffle ring 44 is carried by the stator core, being supported by the adjacent ends of the strips or wedges 32 which secure the stator windings in place, as best shown in FIGURE 4. Only running clearance exists between the rotating cylinder 41 and the stationary baffle ring 44.

Encircling the shaft 13 between the blower 43 and the adjacent bearing 35, is a stationary annular header 45. This header may be constructed in any suitable manner, as by circular and cylindrical parts welded together; and projecting axially inwardly from the header are three nozzles 46. These nozzles are positioned to discharge into the inlet of the blower; and although there are three such nozzles employed in the motor illustrated, the number thereof may be increased or decreased, if desired, it being only necessary that, together, the nozzles are capable of delivering fluid cooling medium from the header to the inlet of the blower and, thence, to the clearance or gap between the stator and rotor at a rate sufficient to assure effective cooling.

A duct 47 connected to the header and leading to the exterior of the motor enclosure, provides means through which a fluid cooling medium derived from the refrigeration system may be fed to the header. The inlet end of the duct 47 connects with the lower end of the duct 19 which always contains liquid refrigerant and in which the pressure is higher than it is in the header.

In operation, liquid refrigerant enters the header 45 through duct 47 and is discharged by the nozzles 46 into the inlet of the blower 43 by which it is impelled into the clearance or gap between the stator and rotor cores. The blower thus coacts with the nozzle action to assure entry of the liquid refrigerant into the clearance or gap. Here the liquid refrigerant evaporates and becomes gaseous. The evaporation of the refrigerant, of course, increases the effectiveness of the refrigerant to abstract heat from the motor, and since the evaporation takes place in the hottest part of the machine, maximum cooling results.

The gaseous refrigerant flows along the clearance or gap between the stator and rotor and out through the radial passages 30 into the receiving chamber 26. From this chamber, the outlet duct 27 carries off the heat laden gaseous refrigerant and returns it to the refrigerating system where the refrigerant is in gaseous form, and preferably, to the pipe 14, as shown in FIGURE 1.

Although the main flow of the refrigerant through the machine is as described, i.e. along the clearance or gap between the stator and rotor and radially out through the passages 30, some of the gaseous refrigerant will flow axially outward through the space around the shaft 13 as well as out through the clearance between the baffle ring 44 and the cylinder 41, to sweep around the adjacent ends of the stator coils and then enter the receiving chamber through ports 50 in the ring 33. By the same token, some of the gaseous refrigerant will leave the far end of the clearance or gap between the stator and rotor and flow around that end of the stator coils to reach the chamber 26, and to direct any such flow a cylindrical baffle 51 encircles the adjacent end of the windings, being supported by the bars 28.

In that form of the invention illustrated in FIGURE 6, the nozzles 46' are positioned to direct the liquid refrigerant discharging therefrom directly toward the clearance or gap between the stator and rotor, and to aid in guiding the refrigerant into the clearance or gap, the projecting ends of the rotor bars 38 are encircled by a cylindrical baffle 53. Also, in this form of the invention, the header 54 is carried directly on the end wall 9, but, of course, is concentrically disposed with respect to the rotor axis. If desired, the nozzles 46' may be equipped with detachable orifice plugs 55 to provide means for adjusting the jets issuing from the nozzles for maximum effectiveness.

Those skilled in this art, will, of course, appreciate that the bearings of the motor are equipped with suitable lubricating means, which, however, forms no part of this invention and, therefore, has not been illustrated. It will also be appreciated that, while one of the illustrated embodiments of this invention has the nozzles which lead from the header, discharge into a fan or blower on the adjacent end of the rotor, the discharge of which is directed into the clearance or air gap between the stator and rotor, this interpositioning of the blower between the nozzles and the entry into the clearance or air gap, does not detract from the fact that the nozzles discharge into the gap. On the contrary, the blower may be simply regarded as a booster to assure the desired functioning of the cooling means.

What is claimed as my invention is:

1. An electric motor adapted for use in a closed refrigeration system, a hermetically sealed enclosure, a stator and a rotor, the stator having a core composed of a stack of laminations arranged in spaced groups and axially projecting stator windings, the spaces therebetween providing radial passages leading from the clearance between the stator and rotor to the periphery of the stator core, the rotor at one end thereof including an axially extending cylindrical baffle, said means comprising: means defining a receiving chamber surrounding the stator core and into which said radial passages open; means defining a header concentric with the rotor and located adjacent to said one end thereof; nozzle means connected with said header and positioned to debouch liquid refrigerant under pressure into the space between said stator winding and said cylindrical baffle and into the clearance between the stator and rotor; inlet duct means leading from outside the enclosure to said header to deliver fluid refrigerant thereto for discharge from the nozzle means and heat abstracting flow past said stator windings and cylindrical baffle and said stator and rotor through said radial passages; and outlet duct means connected with the receiving chamber to carry off the refrigerant along with the heat abstracted thereby.

2. In a totally enclosed electric motor: a hermetically sealed enclosure having a cylindrical shell; a stator and a rotor inside the enclosure, the stator having windings axially extending from the ends thereof and a core composed of a stack of laminations arranged in spaced groups so that the stator has radial passages leading from the clearance between the stator and rotor to the periphery of the stator core, the rotor having a cylindrical baffle in axial extension from one end thereof; means mounting the stator core in the shell with the periphery of its core spaced concentrically from the shell to provide an annular receiving chamber into which said radial passages open; means inside the enclosure defining an annular header concentric with the rotor core and at one end thereof; a plurality of nozzles leading from the header at circumferentially spaced points, and all positioned to discharge toward the space between said stator winding and said cylindrical baffle and into the clearance between the stator and rotor; inlet duct means leading to the header from outside the enclosure to supply a liquid coolant to the header for discharge by the nozzles whereby liquid coolant abstracts heat energy from said stator and said rotor and vaporizes into a gas to flow in said form into said receiving chamber over said stator windings and also through the radial passages in the stator core; and outlet duct means connected with the shell for carrying off the gaseous coolant from said receiving chamber.

3. In an electric motor: a rotor having a core mounted on a shaft and winding bars extending lengthwise of the core and projecting from one end thereof to provide the blades of a blower; ring means connected to the outer end portions of said winding bars electrically short circuiting said bars and defining a housing for the blower with an inlet adjacent to the shaft and an outlet contiguous to the adjacent end of the rotor core; an annular header surrounding the shaft and axially adjacent to said ring means; a plurality of nozzles extending axially from said header toward the adjacent end of the rotor core with their discharge ends positioned to debouch into the inlet of the blower; inlet duct means connected with a header to supply a liquid coolant to the header for discharge by the nozzles into the inlet of the fan; a stator core surrounding the rotor with running clearance therebetween, said stator core being composed of a stack of laminations arranged in spaced apart groups so as to provide radial passages leading to the periphery of the stator from the clearance between the stator and rotor cores; a baffle ring carried by the stator contiguous to the outlet of the blower to direct the discharge of the blower into the clearance between the stator and rotor cores so that fluid coolant discharged by the blower is caused to flow into said clearance where it abstracts heat energy and then flows out through the radial passages in the stator core to be discharged from the motor.

4. In a totally enclosed electric motor: a hermetically sealed enclosure having a cylindrical shell; a stator and a rotor inside the enclosure, the stator having windings axially extending from the ends thereof and a core composed of a stack of laminations arranged in spaced groups so that the stator has radial passages leading from the clearance between the stator and rotor to the periphery of the stator core; the rotor having a centrally disposed shaft and blades in axial extension from one end thereof at the periphery, a cylindrical baffle carried on said blades in spaced relationship from the end of said rotor to define therewith an impeller of a blower having an axial inlet adjacent to and encircling the shaft of the rotor and a peripheral outlet adjacent to the end of the rotor; means mounting the stator core in the shell with the periphery of its core spaced concentrically from the shell to provide an annular receiving chamber into which said radial passages open; means inside the enclosure defining an annular header concentric with the rotor shaft and adjacent the cylindrical baffle on the rotor; a plurality of nozzles projecting from the header at circumferentially spaced points and into the axial inlet of the blower, cupped ring means carried by the end of said stator overlying said peripheral outlet of said blower and co-acting with said cylindrical baffle to capture fluid discharge of the blower and to force the same into the clearance between said rotor and stator cores and through the clearance between said cupped ring means and said cylindrical baffle; inlet duct means leading to the header from outside the enclosure to supply a liquid coolant to the header for discharge by the nozzles into said blower, whereby liquid coolant passes from said blower into said cupped ring means and through the clearance between said rotor and stator and through the clearance between the ring means and cylindrical baffle, thereby abstracting heat energy and vaporizing in a flow over said stator windings and through the radial passages in the stator core into said receiving chamber; an outlet duct means connected within the shell for carrying off the vaporized coolant from the receiving chamber.

5. In a totally enclosed electric motor: a hermetically sealed enclosure having a cylindrical shell; a stator and a rotor inside the enclosure, the stator having windings axially extending from the ends thereof and a core composed of a stack of laminations arranged in spaced groups so that the stator has radial passages leading from the clearance between the staor and rotor to the periphery of the stator core, the rotor having a cylindrical baffle in axial extendsion from one end thereof, whereby said windings and said cylindrical baffle define a substantially annular funnel for which the end thereof terminates in the clearance between said rotor and stator; means mounting the stator core in the shell with a periphery of its course spaced concentrically from the shell to provide an annular receiving chamber into which said radial passages open; means inside the enclosure defining an annular header concentric with the shaft of the core and at said one end thereof; a plurality of nozzles leading from the header at circumferentially spaced points and positioned to discharge directly into said annular funnel; inlet duct means leading to the header from outside the enclosure to supply a liquid coolant to the header for discharge by the nozzles into the annular funnel, whereby liquid coolant is caught in the turbulence between said stationary stator and rotating rotor and is forced against said winding and also into the clearance between said rotor and stator, thereby to abstract heat energy from said motor and vaporized into gas flowing into said receiving chamber over said stator windings and also through the radial passages in the stator core; an outlet duct means connected with the shell for carrying off the gaseous coolant from the receiving chamber.

6. The totally enclosed electric motor set forth in claim 5 wherein said stator windings axially overextend said cylindrical baffle and overlie said plurality of nozzles, and wherein the ends of said nozzles are displaced from the end of said cylindrical baffle, whereby coolant discharged by the nozzles are carried against said rotating cylindrical baffle and deflected by centrifugal force against said stator windings and also forced into the clearance between said rotor and stator thereby to abstract heat energy from a maximum of motor surface area.

References Cited in the file of this patent

UNITED STATES PATENTS

| | | |
|---|---|---|
| 872,708 | Behrend | Dec. 3, 1907 |
| 994,810 | Westinghouse | June 13, 1911 |
| 1,114,727 | Breeze | Oct. 27, 1914 |
| 1,121,014 | Hobart | Dec. 15, 1914 |
| 1,691,696 | Baum | Nov. 13, 1928 |
| 2,249,882 | Buchanan | July 22, 1941 |
| 2,688,946 | Jorsaillon | Sept. 14, 1954 |

FOREIGN PATENTS

| | | |
|---|---|---|
| 194,976 | Switzerland | Mar. 16, 1938 |